US011188471B2

(12) United States Patent
Duan et al.

(10) Patent No.: US 11,188,471 B2
(45) Date of Patent: Nov. 30, 2021

(54) CACHE COHERENCY FOR HOST-DEVICE SYSTEMS

(71) Applicant: Alibaba Group Holding Limited, Grand Cayman (KY)

(72) Inventors: Lide Duan, Hangzhou (CN); Dimin Niu, Hangzhou (CN); Hongyu Liu, Hangzhou (CN); Shuangchen Li, Hangzhou (CN); Hongzhong Zheng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/839,894

(22) Filed: Apr. 3, 2020

(65) Prior Publication Data

US 2021/0311878 A1 Oct. 7, 2021

(51) Int. Cl.
  *G06F 12/0877* (2016.01)
  *G06F 12/0831* (2016.01)
  *G06F 12/0817* (2016.01)
  *G06F 13/16* (2006.01)

(52) U.S. Cl.
  CPC ...... *G06F 12/0877* (2013.01); *G06F 12/0824* (2013.01); *G06F 12/0833* (2013.01); *G06F 13/1684* (2013.01); *G06F 2212/1021* (2013.01)

(58) Field of Classification Search
  CPC ............. G06F 12/0877; G06F 12/0834; G06F 12/0833; G06F 12/0806; G06F 12/0815; G06F 12/0831; G06F 12/084; G06F 12/0842; G06F 2212/1021
  See application file for complete search history.

(56) References Cited

U.S. PATENT DOCUMENTS

| 5,611,070 | A | 3/1997 | Heidelberger et al. |
| 6,883,070 | B2 * | 4/2005 | Martin ................ G06F 12/0817 709/224 |
| 6,928,519 | B2 | 8/2005 | Cypher |
| 7,529,893 | B2 | 5/2009 | Landin et al. |
| 8,010,749 | B2 | 8/2011 | Landin et al. |
| 8,762,652 | B2 | 6/2014 | Moyer |
| 10,282,811 | B2 | 5/2019 | Ray et al. |
| 10,650,483 | B2 | 5/2020 | Ray et al. |
| 10,795,819 | B1 | 10/2020 | Pawlowski et al. |
| 10,877,904 | B2 | 12/2020 | Ramagiri et al. |

(Continued)

OTHER PUBLICATIONS

Martin, M.M.K., Sorin, D.J., Hill, M.D., and D.A. Wood, "Bandwidth Adaptive Snooping," Proceedings of the 8th International Symposium on High-Performance Computer Architecture (HPCA '02), 2002.*

(Continued)

*Primary Examiner* — Tracy A Warren (57) ABSTRACT

A cache coherency mode includes: in response to a read request from a device in the host-device system for an instance of the shared data, sending the instance of the shared data from the host device to that device; and, in response to write request from a device, storing data associated with the write request in the cache of the host device. Shared data is pinned in the cache of the host device, and is not cached in any of the other devices in the host-device system. Because there is only one cached copy of the shared data in the host-device system, the devices in that system are cache coherent.

22 Claims, 7 Drawing Sheets

(56) References Cited

U.S. PATENT DOCUMENTS

| | | | |
|---|---|---|---|
| 10,896,089 B2 | 1/2021 | Helmick et al. | |
| 10,908,846 B2 | 2/2021 | Lee et al. | |
| 10,909,046 B2 | 2/2021 | Murphy | |
| 10,936,525 B2 | 3/2021 | Orthner et al. | |
| 2004/0002992 A1* | 1/2004 | Cypher | G06F 12/0815 |
| 2004/0003182 A1 | 1/2004 | Cypher | |
| 2004/0260886 A1 | 12/2004 | Landin et al. | |
| 2013/0007376 A1* | 1/2013 | Kottapalli | G06F 12/0833 |
| | | | 711/146 |
| 2016/0147658 A1* | 5/2016 | Ambroladze | G06F 15/173 |
| | | | 711/141 |
| 2017/0371787 A1* | 12/2017 | Kalyanasundharam | |
| | | | G06F 12/0842 |
| 2018/0203800 A1* | 7/2018 | Daglis | G06F 12/1458 |
| 2019/0018806 A1 | 1/2019 | Koufaty et al. | |
| 2019/0042429 A1* | 2/2019 | Kumar | G06F 12/0831 |
| 2019/0102292 A1 | 4/2019 | Agarwal et al. | |
| 2019/0102311 A1 | 4/2019 | Gupta et al. | |
| 2019/0347125 A1 | 11/2019 | Sankaran et al. | |
| 2020/0004703 A1 | 1/2020 | Sankaran et al. | |
| 2020/0401440 A1 | 12/2020 | Sankaran et al. | |

OTHER PUBLICATIONS

Nagarajan, V., Sorin, D.J., Hill, M.D., and D.A. Wood, "A Primer on Memory Consistency and Cache Coherence," Second Edition, 2020.*

* cited by examiner

CACHE COHERENCY FOR HOST-DEVICE SYSTEMS

BACKGROUND

Figure 1:
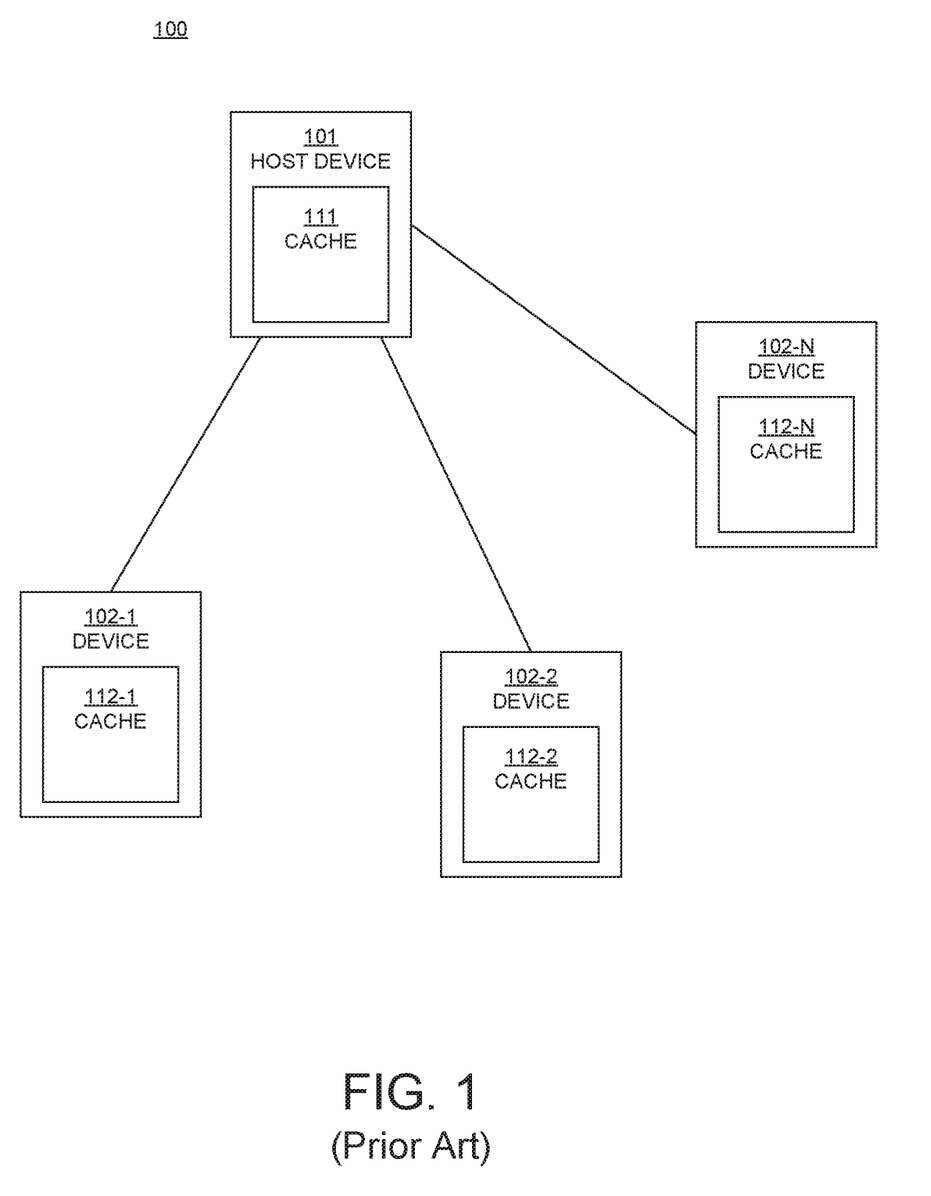
FIG. 1 is a block diagram illustrating a conventional host-device system.

FIG. 1 illustrates a host-device system 100 that includes a host device 101 that can communicate with N devices 102-1, 102-2, ..., 102-N. The host device 101 and the devices 102 each have their own cache 111, 112-1, 112-2, ..., 112-N, respectively.

In the system 100, multiple devices may access the same memory block in one of the caches. In each of those accesses, the device reads that memory block at least once and writes to that memory block at least once. For example, all of the devices may be incrementing the same counter. Also, the read accesses and write accesses by one device may occur at the same time as the read accesses and write accesses by one or more of the other devices, and the read accesses and write accesses from different devices may be arbitrarily mixed.

Because the host device 101 and the devices 102 each cache their data locally in their respective caches 111 and 112, the data in one cache may be different from the data in another cache depending, for example, on the order in which the reads and writes occur.

Consequently, a cache coherency protocol is needed to maintain cache coherency across the devices in the system 100.

SUMMARY

Disclosed herein is a novel cache coherency protocol or mode.

In embodiments, a host-device system includes a host device and a number of other devices that are communicatively coupled to the host device (e.g., by a bus and/or in a network, wired and/or wirelessly). Shared data (data that is accessible by at least two of the devices in the host-device system) is stored in a cache of the host device. Communication between the devices in the host-device system occurs through the host device. In these embodiments, a cache coherency mode includes: in response to a read request from a device in the host-device system for an instance of the shared data, sending the instance of the shared data from the host device to that device; and, in response to a write request from a device, storing data associated with the write request in the cache of the host device. In this cache coherency mode (which may be referred to herein as the first cache coherency mode), shared data is "pinned" in the cache of the host device, and is not cached in any of the other devices in the host-device system. Because there is only one cached copy of the shared data in the host-device system, the devices in that system are cache coherent (that is, the shared data is coherent across all of the caches in the system).

Embodiments according to the invention reduce the latency associated with reading data; reduce the amount of data transferred between devices, thus conserving bandwidth; reduce the number of messages associated with maintaining cache coherency, thus also reducing latency and conserving bandwidth; and are not snooping-based (e.g., devices do need to snoop messages sent by other devices).

Also disclosed herein is a novel method of cache coherency management that adaptively and dynamically switches among different cache coherency modes.

In embodiments, in a host-device system like that described above, the aforementioned first cache coherency mode is selected from a number of cache coherency modes when a first condition and a second condition are both satisfied. The first condition is satisfied, for example, when there are many cache misses in the host-device system or, for example, when each device in the host-device system experiences many cache misses. The second condition is satisfied when the number of read and write requests (access requests) associated with the shared data are about the same from different (e.g., at least two) devices in the host-device system.

If the first and second conditions are not both satisfied, then a different cache coherency mode is selected. For instance, in an embodiment, when the first and second conditions are not satisfied but a third condition is satisfied, then a second cache coherency mode is selected. The third condition is satisfied, for example, when one of the devices in the host-device system is dominating the number of access requests. In the second cache coherency mode, the shared data is stored (pinned) in the cache of the dominating device and is not cached in any other device in the system. If the first, second, and third conditions are not satisfied, then a third cache coherency mode (e.g., a snooping-based protocol) is selected.

The above, and other, objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Further-more, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending;" "accessing," "determining," "using," "storing," "selecting," "making," "caching," "reading," "writing," "executing," "snooping," "invalidating," or the like, refer to actions and processes (e.g., the flowcharts 300 and 600 of FIGS. 3 and 6, respectively) of an apparatus or computer system or similar electronic computing device or processor (e.g., the system 700 of FIG. 7). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 2:
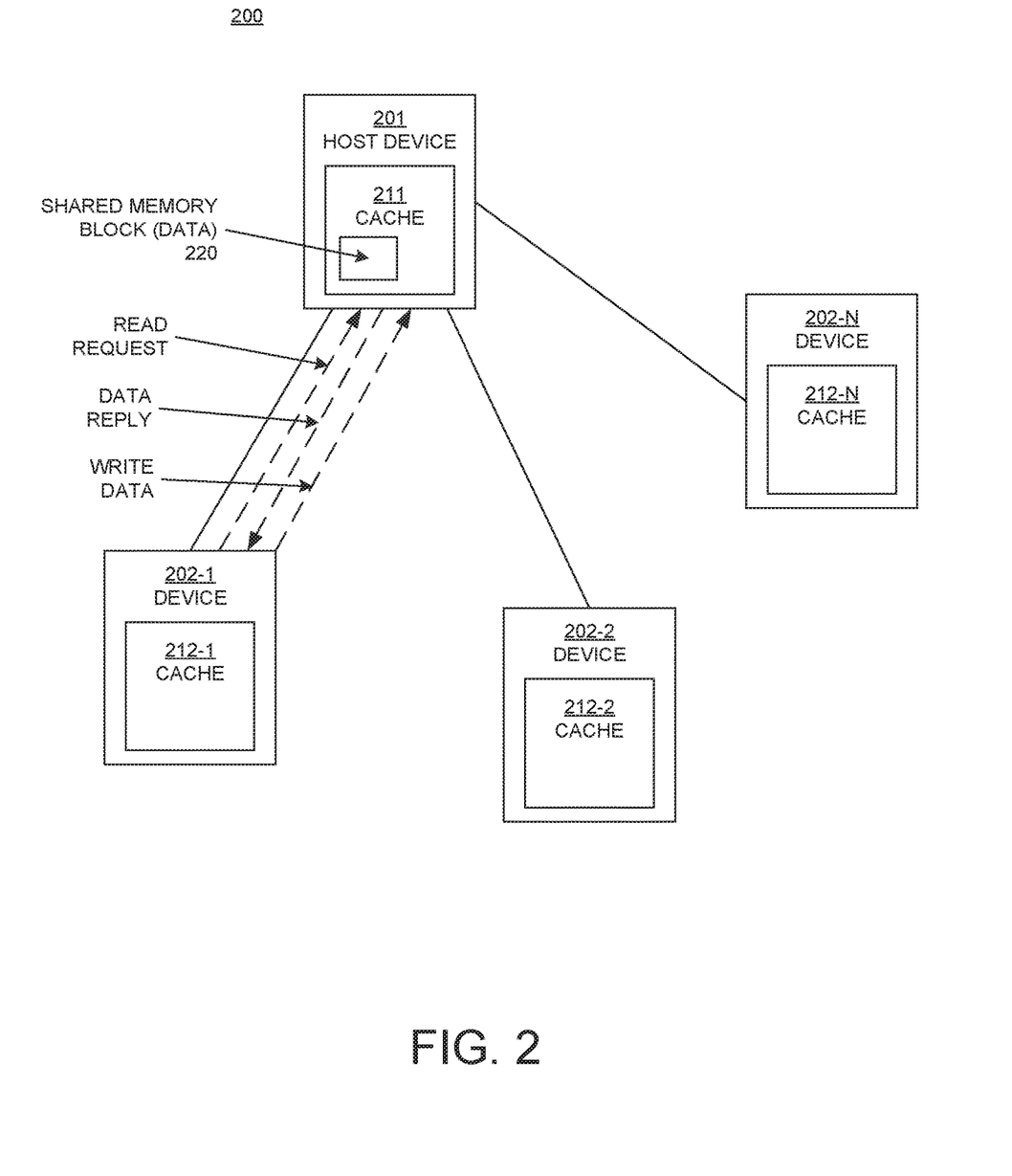
FIG. 2 illustrates a host-device system and a first cache coherency mode that can be executed in the host-device system in embodiments according to the present invention.

FIG. 2 illustrates a host-device system 200 that includes a host device 201 and N devices 202-1, 202-2, . . . , 202-N (N is an integer) in embodiments according to the present invention. The devices 202-1, 202-2, . . . , 202-N may be referred to herein individually as the device 202 or collectively as the devices 202. The host device 201 has its own cache 211, and the devices 202 each have their own cache 212-1, 212-2, . . . , 212-N, respectively. The caches 212-1, 212-2, . . . , 212-N may be referred to herein individually as the cache 212 or collectively as the caches 212.

The devices 202 are communicatively coupled to the host device 201 over, for example, a bus and/or over a network, wired and/or wirelessly. Communication between the devices 202 in the host-device system 200 occurs through the host device 201. In an embodiment, communication between the devices 202 in the host-device system 200 occurs only through the host device 201; the devices 202 do not directly communicate with each other.

In the discussion to follow, a shared memory block 220 is located in the cache 211 of the host device 201; however, the shared memory block can be located in any of the devices in the system 200. The host device 201 can also access (read from and write to) the shared memory block 220.

Multiple devices in the host-device system 200 may access the same (shared) memory block 220. Data in the shared memory block 220 is referred to herein as shared data or instances of shared data. In each access by a device of the shared memory block 220, the device reads the shared memory block 220 at least once and writes to that memory block at least once. Also, the read accesses and write accesses from/to the shared memory block 220 by one device may occur at the same time as the read accesses and write accesses from/to the shared memory block by one or more of the other devices, and the read accesses and write accesses from/to the different devices may be arbitrarily mixed. The read and write accesses of the shared memory block 220 may be an atomic transaction.

Accesses to the shared memory block 220 may be true sharing or false sharing. The terms "true sharing" and "false sharing" are used herein as they would be understood by one of ordinary skill in the art. For example, in true sharing, an instance of data in a cache line is accessed by different devices; and in false sharing, different instances of data may be accessed by different devices but the different instances of data are in the same cache line.

In embodiments according to the present invention, the system 200 executes a cache coherency mode that may be referred to herein as the first cache coherency mode. The system 200 can also execute other cache coherency modes, which will be further described below. In the first cache coherency mode, instances of the shared data are not stored in a cache on a device 202 other than the host device 201. The first cache coherency mode is described further in conjunction with FIG. 3.

Figure 3:
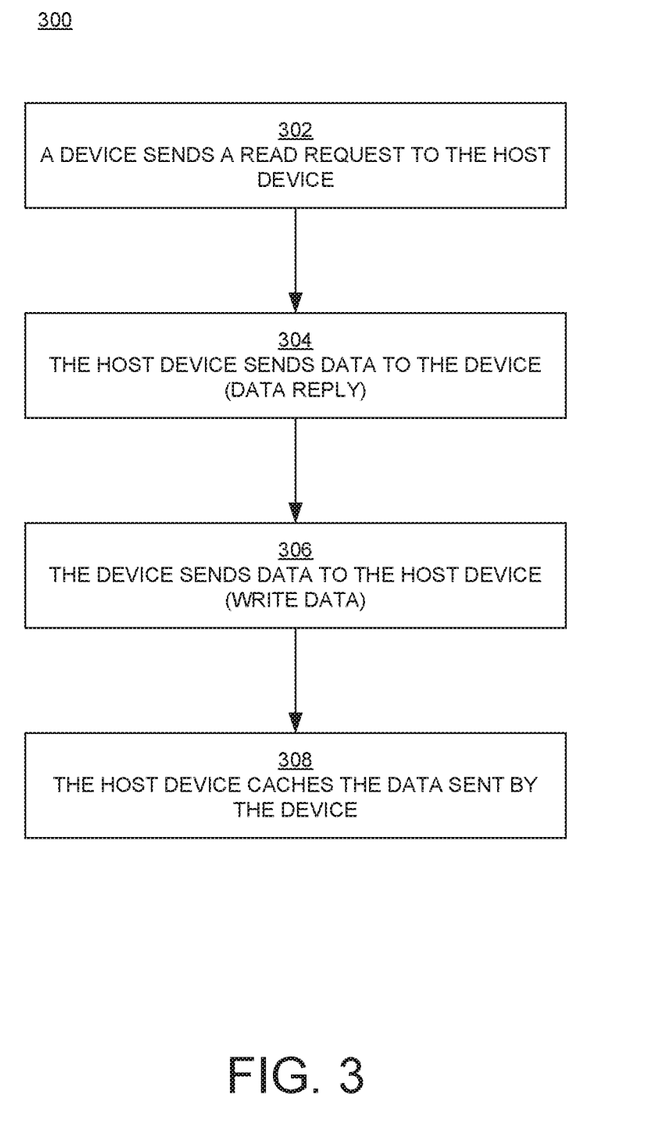
FIG. 3 is a flowchart illustrating operations in the first cache coherency mode in embodiments according to the present invention.

FIG. 3 is a flowchart 300 illustrating operations in a method for cache coherency in embodiments according to the present invention. Specifically, the flowchart 300 illustrates the aforementioned first cache coherency mode.

In block 302, with reference also to FIG. 2, a device 202 sends, to the host device 201, a read request for an instance of the shared data.

In block 304, in response to the device 202 that made the read request, the host device 201 sends the instance of the shared data to the device 202.

In block 306, the device 202 sends a write request with data to be written to the host device 201. The data may be an updated or changed version of the shared data that was sent in block 304.

In block 308, the host device 201 stores the data associated with the write request in the cache 211.

The process just described is repeated for other accesses of the shared data by the devices 202.

In the first cache coherency mode, the shared data is "pinned" in the cache 211 of the host device 201 and is not cached in the devices 202. The term "pinned" is used herein to mean that, in the first cache coherency mode, the devices in the host-device system 200 recognize that the only true version of the shared data resides in the cache 211 of the host device 201. Because there is only one cached copy of the shared data in the host-device system 200, the devices 201 and 202 are cache coherent (that is, the shared data is coherent across all of the caches 211 and 212 in the system 200).

Figure 4:
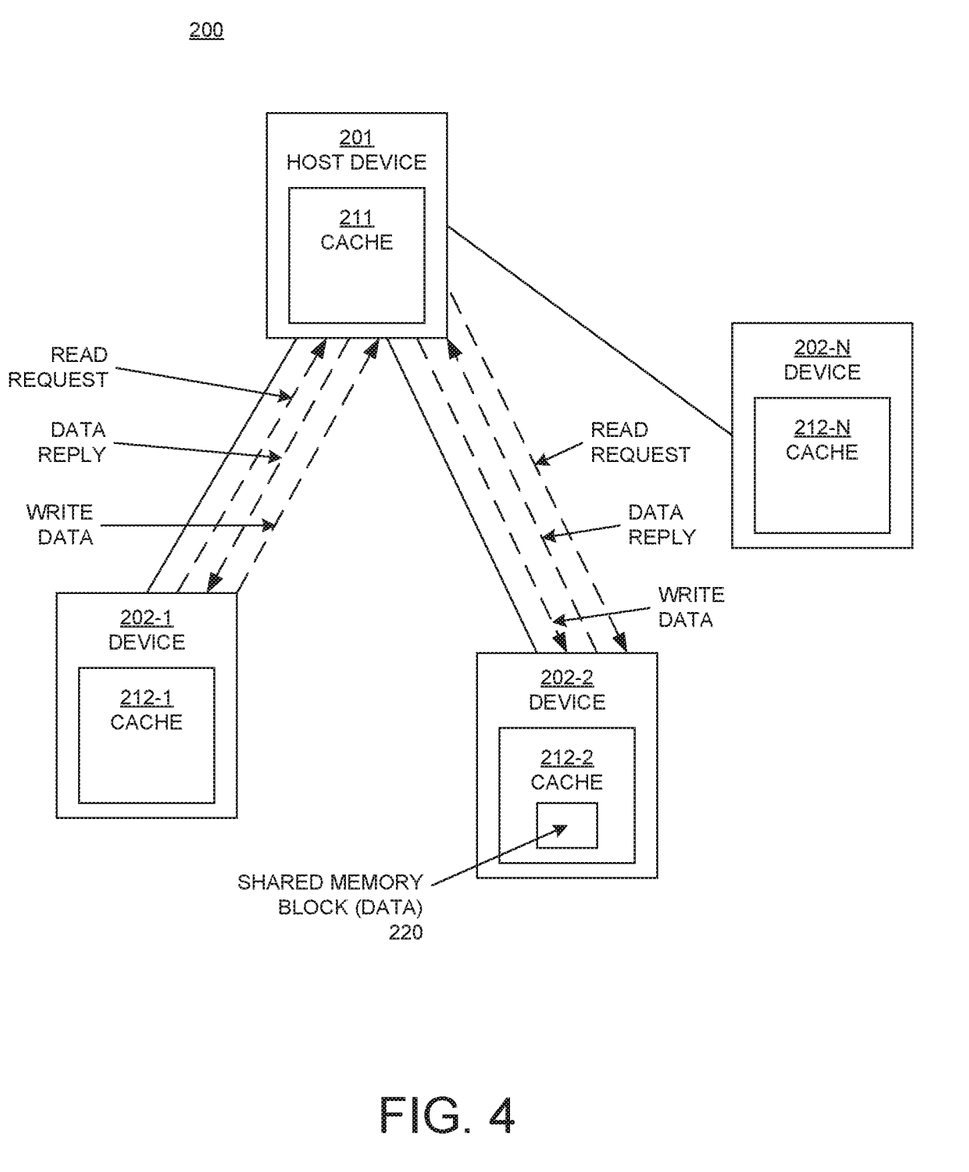
FIG. 4 illustrates a second cache coherency mode that can be executed in the host-device system in embodiments according to the present invention.

As mentioned above, the host-device system 200 can execute other cache coherency modes in addition to the first cache coherency mode. FIG. 4 illustrates a second cache coherency mode that can be executed by the host-device system 200 in embodiments according to the present invention. In the second cache coherency mode, the shared data is stored (pinned) in the cache 212 of one of the devices 202 and is not cached in any other device in the host-device system 200. In an embodiment, the device that makes the most access requests is selected as the device where the shared data is stored.

In the example of FIG. 4, the shared data is stored in the cache 212-2 of the device 202-2, and the device 202-1 will be accessing an instance of the shared data. To do so, the device 202-1 sends a read request to the host device 201, which forwards the read request to the device 202-2. The device 202-2 sends the requested instance of the shared data to the host device 201, which forwards that data to the device 202-1. The device 202-1 then sends data to be written to the host device 201, which forwards that data to the device 202-2. The device 202-2 stores the data in the cache 212-2.

The process just described is repeated for other accesses of the shared data by the devices 202.

In the second cache coherency mode, there is only one cached copy of the shared data in the host-device system 200, and so the devices 201 and 202 are cache coherent (that is, the shared data is coherent across all of the caches 211 and 212 in the system 200). Relative to the first cache coherency mode, the second cache coherency mode: has greater read latency; transfers more data and so uses more bandwidth; and requires the exchange of more cache coherency-related messages between devices in the system, which also increases latency and consumes bandwidth. Additional information is provided further below (see Table 1).

Figure 5:
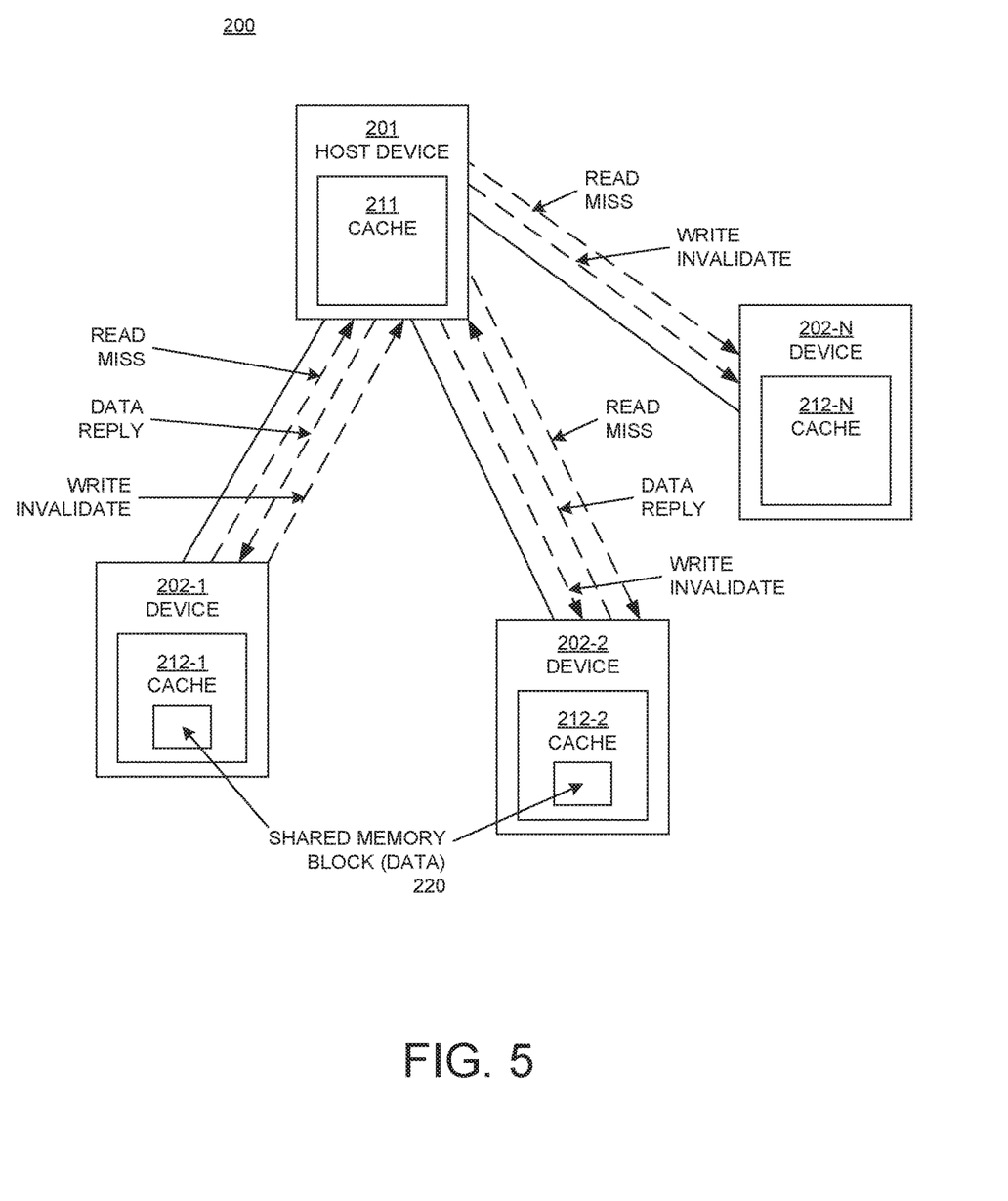
FIG. 5 illustrates a third cache coherency mode that can be executed in the host-device system in embodiments according to the present invention.

FIG. 5 illustrates a third cache coherency mode that can be executed by the host-device system 200 in embodiments according to the present invention. In the third cache coherency mode, the shared data is stored locally on the devices 201 and 202 in the system 200. The third cache coherency mode may be referred to as a snooping-based coherency protocol.

In the example of FIG. 5, the device 202-2 has just finished accessing the shared memory block that holds the shared data, and so the cache 212-2 has a dirty cache line that includes the current version of a shared instance of data. In this example, the device 202-1 is about to access the shared memory block. First, the device 202-1 sends a cache read-miss message to the host device 201. In response to the read-miss message, the host device 201 broadcasts a read-miss message to the other devices 202-2, ..., 202-N in the system 200. The device 202-2 snoops the read-miss message, and sends the dirty cache line to the host device 201 in response. The host device 201 sends the dirty cache line to the device 202-1, so at this point both the devices 202-1 and the 202-2 have the current version of the instance of shared data. The device 202-1 can update the instance of shared data, and so the cache 212-1 now has a dirty cache line that includes the most recent version of the instance of shared data. The device 202-1 then sends a write-invalidate message to the host device 201, and the host device broadcasts that message to the other devices 202-2, ..., 202-N in the system 200. The device 202-2 snoops the write-invalidate message, and invalidates the cache line in the cache 212-2 that includes the shared instance of data.

The process just described is repeated for other accesses of the shared data by the devices 202.

Relative to the first cache coherency mode, the third cache coherency mode: has greater read latency; transfers more data and so uses more bandwidth; requires the exchange of more cache coherency-related messages between devices in the system, which also increases latency and consumes bandwidth; and is snooping-based (e.g., devices need to snoop messages sent by other devices). Additional information is provided below in Table 1, which provides a comparison of performance metrics for the first, second, and third cache coherency modes.

TABLE 1

Comparison of Performance Metrics

| Mode | Data Read Latency | Total Data Transfer Amount | Coherency Messages | Device Snooping? |
|---|---|---|---|---|
| 3rd | 4 hops (2-hop read miss and 2-hop data reply) | 2 * (cache line size) * (device accesses) | (N read missed) + (N write misses) | Yes |
| 2nd | Local read/write hit for pinned device; 4 hops for all other devices | 4 * (read/write data amount) * (device accesses) * (N − 1/N) | (2 read requests) + (2 write requests) | No |
| 1st | 2 hops | 2 * (read/write data amount) * (device accesses) | (1 read request) + (1 write request) | No |

In Table 1, N is the number of devices in the system 200. In the second cache coherency mode, the factor (N−1/N) accounts for the fact that the device in which the shared data is pinned does not transfer data. Also, in the first and second cache coherency modes, the read/write data amount can be less than or equal to the size of a cache line.

As demonstrated by the information in Table 1, the first cache coherency mode reduces the latency associated with reading data; reduces the amount of data transferred between devices, thus conserving bandwidth; reduces the number of messages associated with maintaining cache coherency, thus also reducing latency and conserving bandwidth; and is not snooping-based (e.g., devices do need to snoop messages sent by other devices). The first cache coherency mode is better than the second and third cache coherency modes in all of the performance metrics. As the number N of devices 202 in the system 200 increases, the benefits associated with the first cache coherency mode become more significant.

Figure 6:
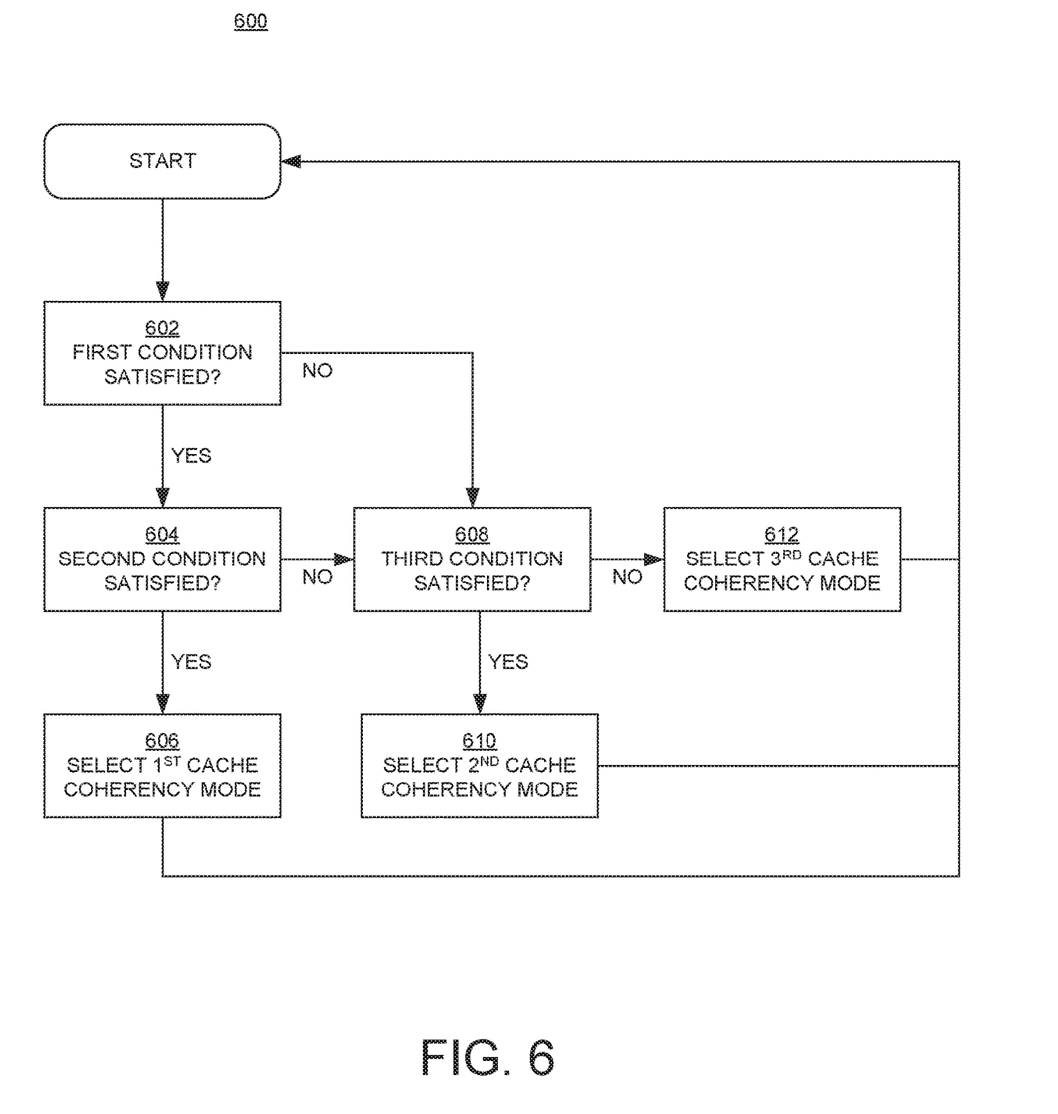
FIG. 6 is a flowchart illustrating operations in a method of cache coherency management in embodiments according to the present invention.

FIG. 6 is a flowchart 600 illustrating operations in a method of cache coherency management in embodiments according to the present invention. Specifically, the flowchart 600 illustrates embodiments of a method of coherency management that adaptively and dynamically switches among the different cache coherency modes. FIG. 6 is discussed with reference also to FIGS. 2, 4, and 5.

In block 602 of FIG. 6, a determination is made with regard to whether or not a first condition is satisfied. In an embodiment, the first condition is satisfied when a number of cache read-misses in the host-device system 200 exceeds a first threshold value. For example, the first condition can be satisfied when the total number of cache read-misses in the host-device system 200 exceeds the first threshold value or when each of the devices 202 in the host-device system experiences a number of cache read-misses that exceeds the first threshold value. A counter or counters can be used to count the number of cache read-misses. If the first condition is satisfied, then the flowchart 600 proceeds to block 604; otherwise, the flowchart proceeds to block 608.

In block 604, a determination is made with regard to whether or not a second condition is satisfied. In an embodiment, the second condition is satisfied when a number of access requests for shared data made by any two or more of the devices 202 in the host-device system 200 is about the same. For example, the second condition is satisfied if the number of access requests made by the device 202-1, and the number of access requests made by the device 202-2, are about the same. In an embodiment, the second condition can be satisfied when a number of access requests for shared data made, per device, by any two or more of the devices 202 in the host-device system 200 is within a specified range. The specified range can be bounded by a second (e.g., lower) threshold value and a third (e.g., higher) threshold value. A counter or counters can be used to count the number of access requests. If the second condition is satisfied, then the flowchart 600 proceeds to block 606; otherwise, the flowchart proceeds to block 608.

In block 606, the first cache coherency mode is selected and executed by the host-device system 200. In the first cache coherency mode, the shared data is stored (pinned) in the cache of the host device 201 and is not cached in any other device in the host-device system 200.

In block 608, a determination is made with regard to whether or not a third condition is satisfied. In an embodiment, the third condition is satisfied when a number of access requests for shared data made by any one of the devices 202 exceeds a fourth threshold value. In other words, the third condition is satisfied when the number of access requests for shared data are dominated by a single device in the host-device system 200. A counter or counters can be used to count the number of access requests. If the third condition is satisfied, then the flowchart 600 proceeds to block 610; otherwise, the flowchart proceeds to block 612.

In block 610, the second cache coherency mode is selected and executed by the host-device system 200. In the second cache coherency mode, the shared data is stored (pinned) in the cache of the dominating device and is not cached in any other device in the host-device system 200.

In block 612, the third cache coherency mode is selected and executed by the host-device system 200. In the third cache coherency mode, the shared data is stored locally on the devices in the host-device system 200.

After a specified period of time, the counter(s) can be reset to an initial value (e.g., zero) and the operations of the flowchart 600 can be repeated.

Figure 7:
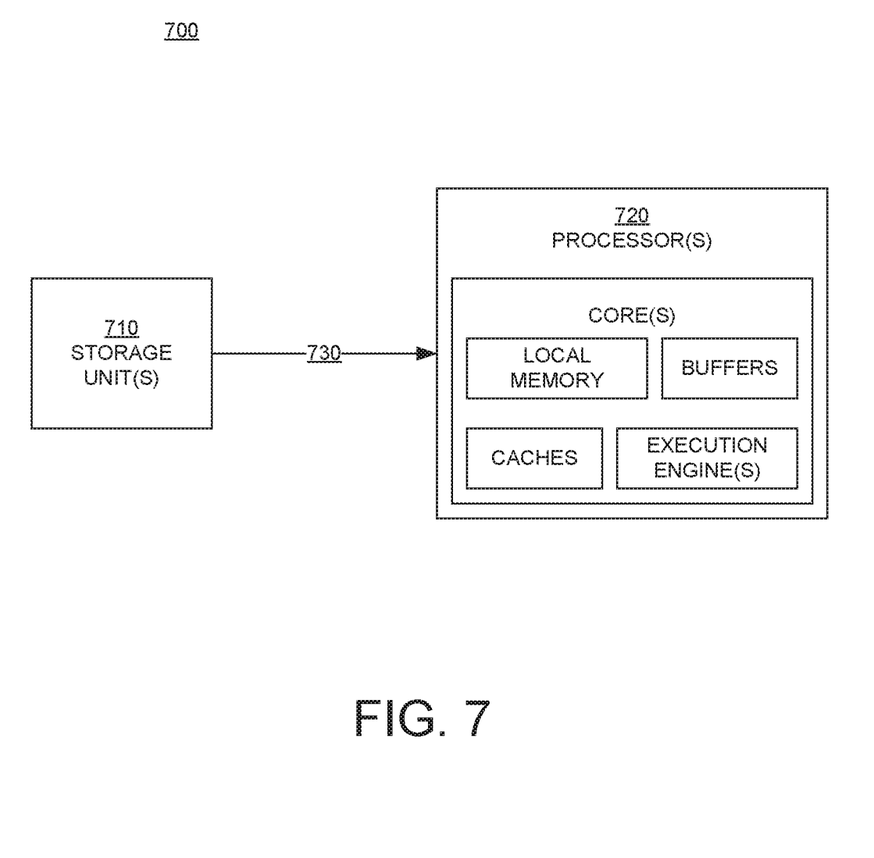
FIG. 7 is a block diagram illustrating an example computing system or device upon which embodiments according to the present invention can be implemented.

FIG. 7 is a block diagram illustrating an example computing system or device 700 upon which embodiments according to the present invention can be implemented. In general, the device 700 is an example of a type of device used in a host-device system such as those described above. The device 700 can be used to execute the methods described above (e.g., the methods of FIGS. 3 and 6).

In the example of FIG. 7, the device 700 can include one or more storage units (computer storage media) 710 and a processor 720 communicatively coupled by a communication interface 730. The processor 720 can include one or more cores, and each core may include local memory that may be distributed among the cores, one or more buffers and/or caches, and one or more execution engines. The term "memory" may be used herein to refer to the buffers and/or caches and/or local memory. The communication interface 730 can include a wired network communication link, a wireless network communication link, a data bus, or the like.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems or devices, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system or device to perform one or more of the example embodiments disclosed herein.

One or more of the software modules may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. In a host-device system comprising a plurality of devices including a host device, a method of cache coherency management, the method comprising:
    storing shared data in a cache of the host device, wherein the shared data comprises data accessible by at least two devices of the plurality of devices; and
    selecting a first cache coherency mode from a plurality of cache coherency modes when both a first condition and a second condition are satisfied, wherein the first condition is satisfied when a number of cache misses in the host-device system exceeds a first threshold value, wherein the second condition is satisfied when a number of access requests associated with the shared data and made per device by any two or more devices is within a range between a second threshold value and a third threshold value, and wherein the first cache coherency mode comprises:
        in response to a device, of the plurality of devices, making a read request to the host device for an instance of the shared data, sending the instance of the shared data from the host device to the device making the read request; and
        in response to a device, of the plurality of devices, making a write request to the host device, storing data associated with the write request in the cache of the host device.

2. The method of claim 1, wherein the shared data is not stored in a cache on a device of the plurality of devices other than the host device.

3. The method of claim 1, wherein communication between the devices of the plurality of devices occurs only through the host device.

4. The method of claim 1, wherein each device of the plurality of devices comprises a respective processor and a respective memory.

5. The method of claim 1, further comprising selecting a cache coherency mode other than the first cache coherency mode when both the first condition and the second condition are not satisfied.

6. The method of claim 5, wherein each of the access requests comprises both a read request and a write request.

7. The method of claim 5, wherein said selecting a cache coherency mode other than the first cache coherency mode comprises:
    determining whether a third condition is satisfied, wherein the third condition is satisfied when a number of access requests associated with the shared data and made by a first device of the plurality of devices exceeds a fourth threshold value;
    when the third condition is satisfied, selecting a second cache coherency mode comprising storing the shared data in a cache of the first device; and
    when the third condition is not satisfied, selecting a third cache coherency mode comprising storing the shared data in caches of the plurality of devices.

8. The method of claim 7, wherein the second cache coherency protocol comprises:
    in response to a second device of the plurality of devices making a read request to the host device for an instance of the shared data: sending, from the host device to the first device, the read request from the second device, wherein the instance of data requested by the second device is stored in a cache of the first device; sending, from the first device to the host device, the instance of data requested by the second device; and sending, from the host device to the second device, the instance of the shared data requested by the second device; and
    in response to the second device making a write request: sending data associated with the write request from the second device to the host device; sending, from the host device to the first device, the data associated with the write request from the second device; and storing the data associated with the write request from the second device in the cache of the first device.

9. The method of claim 7, wherein the third cache coherency protocol comprises:
    accessing, by the first device, a version of an instance of the shared data from the cache of the host device;
    storing the version of the instance of data in the cache of the first device, wherein the cache of the first device comprises a dirty cache line that includes the version of the instance of data;
    sending, by a second device of the plurality of devices, a cache read-miss message to the host device;
    sending, from the host device and in response to the cache read-miss message, a read-miss message to other devices of the plurality of devices;
    snooping, by the first device, the read-miss message;
    sending, from the first device in response to said snooping, the dirty cache line to the host device;
    sending, from the host device to the second device, the dirty cache line;
    storing the dirty cache line in the cache of the second device;
    sending, from the second device to the host device, a write-invalidate message;
    sending, from the host device, the write-invalidate message to the other devices of the plurality of devices;
    invalidating, by the first device in response to the write-invalidate message, the dirty cache line in the cache of the first device.

10. In a host-device system comprising a plurality of devices including a host device, a method for cache coherency, the method comprising:
    storing shared data in a cache of the host device, wherein the shared data comprises data accessible by at least two devices of the plurality of devices, and wherein communication between the devices of the plurality of devices occurs through the host device; and
    executing a first cache coherency mode of a plurality of cache coherency modes when both a first condition and a second condition are satisfied, wherein the first condition is satisfied when a number of cache misses in the host-device system exceeds a first threshold value, wherein the second condition is satisfied when a number of access requests associated with the shared data and made per device by any two or more devices is within a range between a second threshold value and a third threshold value, and wherein the first cache coherency mode comprises:
- in response to a device, of the plurality of devices, making a read request for an instance of the shared data, sending the instance of the shared data from the host device to the device making the read request; and
- in response to a device, of the plurality of devices, making a write request, storing data associated with the write request in the cache of the host device.

11. The method of claim 10, wherein each device of the plurality of devices comprises a respective processor and a respective memory.

12. The method of claim 10, wherein each of the access requests comprises both a read request and a write request.

13. The method of claim 10, wherein the plurality of cache coherency modes further comprises:
- a second cache coherency mode comprising storing instances of the shared data in a cache of a third device of the plurality of devices, wherein the second cache coherency mode is executed when the first and second conditions are not satisfied and a third condition is satisfied, and wherein the third condition is satisfied when a number of access requests associated with the shared data and made by the third device exceeds a fourth threshold value; and
- a third cache coherency mode comprising storing instances of the shared data in caches of the first, second, and third devices, wherein the third cache coherency mode is executed when the first, second, and third conditions are not satisfied.

14. A system, comprising:
a host device comprising a first cache; and
a plurality of devices communicatively coupled to the host device, each device of the plurality of devices comprising a respective cache;
wherein the host device stores shared data in the cache, wherein the shared data comprises data accessible by at least two devices of the plurality of devices;
wherein further the host device is operable for executing a first cache coherency mode of a plurality of cache coherency modes when a first condition and a second condition are both satisfied; wherein the first condition is satisfied when a number of cache misses in the system exceeds a first threshold value; and wherein the second condition is satisfied when a number of access requests associated with the shared data and made by a first device of the plurality of devices, and a number of access requests associated with the shared data and made by a second device of the plurality of devices, are both within a range between a second threshold value and a third threshold value, wherein when executing the first cache coherency mode the host device:
- sends an instance of the shared data from the host device to a device, of the plurality of devices, making a read request for the instance of the shared data; and
- stores data associated with a write request from a device of the plurality of devices in the first cache.

15. The system of claim 14, wherein communication between the devices of the plurality of devices occurs through the host device.

16. The system of claim 14, wherein the host device and each device of the plurality of devices comprises a respective processor and a respective memory.

17. The system of claim 14, wherein each of the access requests comprises both a read request and a write request.

18. The system of claim 14, wherein further the host device and the plurality of devices are operable for executing a second cache coherency mode and a third cache coherency mode of the plurality of cache coherency modes;
wherein the second cache coherency mode is executed when the first and second conditions are not satisfied and a third condition is satisfied, wherein the third condition is satisfied when a number of access requests associated with the shared data and made by the third device exceeds a fourth threshold value;
wherein the third cache coherency mode is executed when the first, second, and third conditions are not satisfied;
wherein, when executing the second cache coherency mode, instances of the shared data are stored in a cache of a third device of the plurality of devices; and
wherein, when executing the third cache coherency mode, instances of the shared data are stored in caches of the first, second, and third devices.

19. The system of claim 14, wherein the devices are communicatively coupled to the host device via a network.

20. The system of claim 14, wherein the devices are communicatively coupled to the host device via a bus.

21. The system of claim 14, wherein the shared data is not stored in a cache on a device of the plurality of devices other than the host device.

22. The method of claim 10, wherein instances of the shared data are not stored in a cache on a device of the plurality of devices other than the host device in the first cache coherency mode.

* * * * *